3,124,426
Patented Mar. 10, 1964

3,124,426
PROCESS FOR TREATING PHOTOSENSITIVE INDIUM SULFIDE COMPOSITIONS
Georges Offergeld, Brussels, and Jean Leon Van Cakenberghe, Lot-Beersel, Belgium, assignors to Union Carbide Corporation, a corporation of New York
No Drawing. Filed May 25, 1961, Ser. No. 112,499
2 Claims. (Cl. 23—293)

The present invention relates to a process for improving the photoconductive properties of photosensitive indium sulfide compositions.

As used herein, the following terms have the following meanings:

The term "photosensitive indium sulfide compositions" refers to the following compositions:

(a) A tetragonal crystalline form of indium sesquisulfide;

(b) A tetragonal crystalline form of indium sesquisulfide containing less than two atom percent in the aggregate of one or more elements selected from the group consisting of copper, silver, gold, zinc, cadmium, mercury, germanium, tin, lead, nitrogen, phosphorus, arsenic, antimony, fluorine, chlorine, bromine, and iodine;

(c) Indium sesquisulfide and a chalcogenide of at least one element selected from the group consisting of zinc, cadmium, mercury, gallium, thallium, aluminum, and divalent lead, the ratio of the number of molecules of chalcognide to the number of molecules of indium sesquisulfide being between 0.1 and 1.5;

(d) Indium sesquisulfide; a chalcogenide of at least one element selected from the group consisting of zinc, cadmium, mercury, gallium, thallium, aluminum, and divalent lead, the ratio of the number of molecules of chalcogenide to the number of molecules of indium sesquisulfide being between 0.1 and 1.5; and less than two atom percent in the aggregate of at least one element selected from the group consisting of copper, silver, gold, zinc, cadmium, mercury, germanium, tin, lead, nitrogen, phosphorus, arsenic, antimony, fluorine, chlorine, bromine, and iodine.

The indium sesquisulfide of any of the above compositions must contain between 40.0 and 40.2 atom percent indium and between 60.0 and 59.8 atom percent sulfur.

The term "saturating sulfur pressure" refers to the pressure of sulfur vapor at which there is an equilibrium with liquid sulfur at the particular temperature being considered.

Since there is a transition point at 740° C., cooling at a rate greater than about 200° C. per hour could produce a rather brittle material, which is generally undesirable.

Heretofore, it has been found that the aforedescribed photosensitive indium compositions can be prepared by melting together under a sulfur pressure between about one and about fifty atmospheres a mixture of indium and sulfur with the appropriate amounts of the aforementioned doping elements and/or chalcogenides. However, in all such compositions previously produced, the maximum resistance in the dark/resistance in the light ratio has been about $10^5$. Also, mechanical processing or extended use of such compositions may have a detrimental effect on the photosensitive properties thereof.

It is, therefore, the main object of the present invention to provide a process for improving the photosensitive properties of photosensitive indium sulfide compositions.

It is another object of the invention to provide a process for increasing the resistance in the dark/resistance in the light ratio of photosensitive indium sulfide compositions.

It is a further object of the invention to provide a process for improving the photosensitive properties of photosensitive indium sulfide compositions which have been subjected to mechanical processing or extended use.

Other aims and advantages of the invention will be apparent from the following description and appended claims.

In accordance with the present invention, there is provided a process for improving the photosensitive properties of a photosensitive indium sulfide composition comprising maintaining the composition at a temperature between about 750 and about 950° C. for at least one hour; decreasing the temperature of the composition to about 700° C. at a rate less than about 200° C. per hour; adjusting the temperature of the composition to about 250° C.; and decreasing the temperature of the composition from about 250° C. to room temperature at a rate between about 1 and about 20° C. per hour, the composition being maintained under a saturating sulfur pressure throughout the process.

Photosensitive indium sulfide compositions prepared without the annealing and controlled cooling steps of the present process usually have a resistance in the dark/resistance in the light ratio between $10^2$ and $10^5$. By treating the same positions in accordance with the inventive process, resistance in the dark/resistance in the light ratios as high as $10^7$ have been obtained. Also, the present process may be used to restore the photosensitive properties in such compositions which may have been damaged by mechanical processing or any other treatment.

The photosensitive indium sulfide compositions may be subjected to the annealing and controlled cooling steps immediately after their formation or after they have been cooled and cut into the desired sizes and shapes. Also, although it is preferred to perform the annealing and controlled cooling steps consecutively, the annealing and cooling steps may be carried out separately with other processing steps therebetween. For example, a composition may be subjected to the annealing step immediately after its formation, then cooled and cut into the desired sizes and shapes, and subsequently reheated to 250° C. under a saturating sulfur pressure and subjected to the controlled cooling step.

In the preferred embodiment of the inventive process, a photosensitive indium sulfide composition is cut into the desired size and shape and placed in a quartz ampulla along with a quantity of sulfur sufficient to produce a saturating sulfur pressure at the particular annealing temperature to be employed. The ampulla is then evacuated and sealed, and the composition is heated to a temperature between about 750 and about 950° C. The composition is then maintained at a temperature between about 750 and about 950° C. for at least one hour, preferably for about 24 hours or more. This annealing step may be carried out by placing the ampulla in any suitable oven.

After the annealing step has been completed, the composition is cooled to about 700° C. at a rate less than about 200° C. per hour. The composition is then further cooled from 700° C. to about 250° C. at any desired rate, such as by quenching, although there is a second transition point at about 420° C. Finally, the composition is cooled from about 250° C. to room temperature at a rate between about one and about 20° C. per hour, preferably between 3 and 6° C. per hour, under a saturating sulfur pressure. Conventional regulating systems for controlling the rate of cooling are well known to those skilled in the art.

As mentioned above, the inventive process can also be used to restore the photosensitive properties in photosensitive indium sulfide composiitons which have been subjected to mechanical treatment or a long period of use. Indeed, the restoration process can be repeated as often as required. The inventive process also improves the mechanical properties (e.g. decreases brittleness) of the subject photosensitive compositions.

In an example of the inventive process, ingots of a tetragonal crystalline form of indium sesquisulfide doped with various amounts of copper were prepared and cut into rectangular plates 10 mm. by 5 mm. by 1 mm. The resistances of the untreated plates in the dark and in the light (standard 40-watt white light at 10 cm. from the plates) were measured and recorded. The plates were than annealed at about 900° C. for 48 hours under a saturating sulfur pressure, cooled in situ (still under saturating sulfur pressure) to 250° C. at a rate of about 65° C. per hour, and further cooled under saturating sulfur pressure to room temperature at a rate of about 4° C. per hour. The resistances of the treated plates in the dark and in the light were measured under the same conditions employed for the treated plates. The resistance values for both the untreated and the treated plates are shown in the following table.

| Copper (atom per cent) | Untreated Plates | | | Treated Plates | | |
|---|---|---|---|---|---|---|
| | $R_{dark}$ in ohms | $R_{light}$ in ohms | Ratio | $R_{dark}$ in ohms | $R_{light}$ in ohms | Ratio |
| 0.00 | $6.0 \times 10^5$ | $3 \times 10^3$ | $2.0 \times 10^2$ | $1.5 \times 10^8$ | 500 | $3.0 \times 10^5$ |
| 0.01 | $1.5 \times 10^5$ | 250 | $6.0 \times 10^2$ | $2.0 \times 10^8$ | 160 | $1.3 \times 10^6$ |
| 0.04 | $1.5 \times 10^6$ | 220 | $6.8 \times 10^3$ | $5.0 \times 10^8$ | 250 | $2.0 \times 10^6$ |
| 0.16 | $2.0 \times 10^5$ | 250 | $8.0 \times 10^2$ | $1.0 \times 10^8$ | 130 | $7.7 \times 10^5$ |
| 0.32 | $1.0 \times 10^6$ | 450 | $2.2 \times 10^3$ | $2.0 \times 10^8$ | 180 | $1.1 \times 10^6$ |
| 1.00 | $3.0 \times 10^5$ | 500 | $6.0 \times 10^2$ | $3.0 \times 10^8$ | 200 | $1.5 \times 10^6$ |

It can be seen from the table that the ratio of resistance in the dark/resistance in the light was generally increased by at least a factor of $10^3$ by the inventive process.

While various specific forms of the present invention have been illustrated and described herein, it is not intended to limit this invention to any of the details herein shown, but only as set forth in the appended claims.

What is claimed is:

1. A process for improving the photosensitive properties of a photosensitive indium sulfide composition selected from the group consisting of (a) a tetragonal crystalline form of indium sesquisulfide; (b) a tetragonal crystalline form of indium sesquisulfide containing less than two atom percent in the aggregate of one or more elements selected from the group consisting of copper, silver, gold, zinc, cadmium, mercury, germanium, tin, lead, nitrogen, phosphorus, arsenic, antimony, fluorine, chlorine, bromine, and iodine; (c) indium sesquisulfide and a chalcogenide of at least one element selected from the group consisting of zinc, cadmium, mercury, gallium, thallium, aluminum, and divalent lead, the ratio of the number of molecules of chalcogenide to the number of molecules of indium sesquisulfide being between 0.1 and 1.5; (d) indium sesquisulfide, a chalcogenide of at least one element selected from the group consisting of zinc, cadmium, mercury, gallium, thallium, aluminum, and divalent lead, the ratio of the number of molecules of chalcogenide to the number of molecules of indium sesquisulfide being between 0.1 and 1.5, and less than two atom percent in the aggregate of at least one element selected from the group consisting of copper, silver, gold, zinc, cadmium, mercury, germanium, tin, lead, nitrogen, phosphorus, arsenic, antimony, fluorine, chlorine, bromine, and iodine, which process comprises maintaining said composition at a temperature between about 750 and about 950° C. for at least one hour; decreasing the temperature of said composition to about 700° C. at a rate less than about 200° C. per hour; adjusting the temperature of said composition to about 250° C.; and then decreasing the temperature of said composition to about 250° C. to room temperature at a rate between about 1 and about 20° C. per hour, said composition being maintained under a saturating sulfur pressure throughout said process.

2. A process for improving the photosensitive properties of a photosensitive indium sulfide composition selected from the group consisting of (a) a tetragonal crystalline form of indium sesquisulfide; (b) a tetragonal crystalline form of indium sesquisulfide containing less than two atom percent in the aggregate of one or more elements selected from the group consisting of copper, silver, gold, zinc, cadmium, mercury, germanium, tin, lead, nitrogen, phosphorus, arsenic, antimony, fluorine, chlorine, bromine, and iodine; (c) indium sesquisulfide and a chalcogenide of at least one element selected from the group consisting of zinc, cadmium, mercury, gallium, thallium, aluminum, and divalent lead, the ratio of the number of molecules of chalcogenide to the number of molecules of indium sesquisulfide being between 0.1 and 1.5; (d) indium sesquisulfide, a chalcogenide of at least one element selected from the group consisting of zinc, cadmium, mercury, gallium, thallium, aluminum, and divalent lead, the ratio of the number of molecules of chalcogenide to the number of molecules of indium sesquisulfide being between 0.1 and 1.5, and less than two atom percent in the aggregate of at least one element selected from the group consisting of copper, silver, gold, zinc, cadmium, mercury, germanium, tin, lead, nitrogen, phosphorus, arsenic, antimony, fluorine, chlorine, bromine, and iodine, which process comprises maintaining said composition at a temperature between about 750 and about 950° C. for at least 24 hours; decreasing the temperature of said composition to about 700° C. at a rate less than about 200° C. per hour; adjusting the temperature of said composition to about 250° C.; and then decreasing the temperature of said composition to room temperature at a rate between about 3 and about 6° C. per hour, said composiition being maintained under a saturating sulfur pressure throughout said process.

References Cited in the file of this patent

FOREIGN PATENTS 832,717     Great Britain _____ Apr. 13, 1960